US006594047B1

(12) United States Patent
Ballintine et al.

(10) Patent No.: US 6,594,047 B1
(45) Date of Patent: Jul. 15, 2003

(54) APPARATUS AND METHOD FOR PROVIDING OPTICAL CHANNEL OVERHEAD IN OPTICAL TRANSPORT NETWORKS

(75) Inventors: James E. Ballintine, Colts Neck, NJ (US); Paul Anthony Bonenfant, Ocean, NJ (US); George W. Newsome, Freehold Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/474,981

(22) Filed: Dec. 29, 1999

(51) Int. Cl.[7] .............................. H04J 14/02; H04J 4/00; H04J 14/08; H04B 10/08
(52) U.S. Cl. ...................... 359/124; 359/110; 359/118; 359/123; 359/135; 359/136
(58) Field of Search .................................. 359/123, 124, 359/135, 110, 136, 118

(56) References Cited

U.S. PATENT DOCUMENTS

| | | | | |
|---|---|---|---|---|
| 5,493,432 A | * | 2/1996 | Yoneda ....................... | 359/110 |
| 5,914,794 A | | 6/1999 | Fee et al. | |
| 6,343,068 B1 | * | 1/2002 | Yamamoto et al. ......... | 370/242 |
| 6,411,410 B1 | * | 6/2002 | Wright et al. ................ | 359/125 |

OTHER PUBLICATIONS

ITU–T Recommedation G.872, Architecture of Optical Transport Networks, Feb. 1999.
ITU–T D.371 (WPs 3, 4/15), "Subcarrier Modulation of Client Signals: Implementation Issues", Nortel, Oct. 1998.
ITU–T D.295 (WP 3/15), "OCh Overhead Transport using Pilot–tone Modulation", NTT, Oct. 1998.
ITU–T D.283 (WPs 3, 4/15), "Limitations and deficiences of sub–carrier modulation for OCh overhead transport", Siemens AG, Germany, Oct. 1998.
ITU–T COM15–121, "Signal Quality Monitoring In Optical Networks", Ericsson, Aug. 1998.
R. Alferness et al., "A Practical Vision for Optical Transport Networking", *Bell Labs Technical Journal*, vol. 4, No. 1, Jan. –Mar. 1999.
ITU–T Recommendation G.975 (11/96), "Forward error correction for submarine systems", 1996.

* cited by examiner

Primary Examiner—Leslie Pascal
Assistant Examiner—M. R. Sedighian

(57) ABSTRACT

Optical channel overhead information for individual optical channels is transported in a message based channel on an optical supervisory channel. Specifically, this is realized by obtaining performance monitoring, and/or performance measurement, and/or operations, and/or administration, and/or maintenance information, and/or the like for the individual ones of one or more optical channels, formatting the obtained information into a message for each individual optical channel and inserting the resulting message(s) into an optical supervisory channel to be transported on the OTN. In one embodiment of the invention, particular overhead information is formatted into a message and controllably inserted into the optical supervisory channel at a prescribed optical network element to be transported on the OTN. In another embodiment of the invention, particular overhead information is formatted into a message and controllably inserted into the optical supervisory channel at a prescribed optical network element to be transported on the OTN to a node including the capability to insert the overhead information into channel associated optical channel overhead to be transported to a network element at which it may be removed. Additionally, overhead information transported in channel associated optical channel overhead may be extracted, formatted into a message and inserted in a message based channel in the OSC. The OSC transports the optical channel overhead to a particular node not equipped for associated overhead insertion or removal, where it is extracted form the OSC and used as desired.

28 Claims, 10 Drawing Sheets

|  | OCH-OH | PAYLOAD | | | | CHECK BYTES | | | | |
|---|---|---|---|---|---|---|---|---|---|---|
|  | COL. 1 | COL. 2 | · | · | · | COL. 239 | COL. 240 | · | · | · | COL. 255 |
| SUBFRAME 1 | 1 | 17 | · | · | · | 3809 | 3825 | · | · | · | 4065 |
| SUBFRAME 2 | 2 | 18 | · | · | · | 3810 | 3826 | · | · | · | 4066 |
| SUBFRAME 3 | 3 | 19 | · | · | · | 3811 | 3827 | · | · | · | 4067 |
| ⋮ | ⋮ | ⋮ | ⋮ | ⋮ | ⋮ | ⋮ | ⋮ | ⋮ | ⋮ | ⋮ | ⋮ |
| SUBFRAME 16 | 16 | 32 | · | · | · | 3824 | 3840 | · | · | · | 4080 |

FIG. 8

|  | FRAMING | MISCELLANEOUS OCh-OH | | BIP |
|---|---|---|---|---|
| SUBFRAME# | FRAME 1 | FRAME 2 | FRAME 3 | FRAME 4 |
| 1 | OA1 FRAMING | TBD | TBD | OCh BIP-8 |
| 2 | OA1 FRAMING | TBD | TBD | OCh BIP-8 |
| 3 | OA1 FRAMING | TBD | TBD | OCh BIP-8 |
| 4 | OA1 FRAMING | TBD | TBD | OCh BIP-8 |
| 5 | OA1 FRAMING | TBD | TBD | OCh BIP-8 |
| 6 | OA1 FRAMING | TBD | TBD | OCh BIP-8 |
| 7 | OA1 FRAMING | TBD | TBD | OCh BIP-8 |
| 8 | OA1 FRAMING | TBD | TBD | OCh BIP-8 |
| 9 | OA2 FRAMING | TBD | TBD | OCh BIP-8 |
| 10 | OA2 FRAMING | TBD | TBD | OCh BIP-8 |
| 11 | OA2 FRAMING | TBD | TBD | OCh BIP-8 |
| 12 | OA2 FRAMING | TBD | TBD | OCh BIP-8 |
| 13 | OA2 FRAMING | TBD | TBD | OCh BIP-8 |
| 14 | OA2 FRAMING | TBD | TBD | OCh BIP-8 |
| 15 | OA2 FRAMING | TBD | TBD | OCh BIP-8 |
| 16 | OA2 FRAMING | TBD | TBD | OCh BIP-8 |

OCh PROCESSOR DATA FLOW

DIGITAL WRAPPER REMOVAL MODE

DIGITAL WRAPPER OCh-S LAYER ACCESS

DIGITAL WRAPPER OCh-S & OCh-D LAYER ACCESS

APPARATUS AND METHOD FOR PROVIDING OPTICAL CHANNEL OVERHEAD IN OPTICAL TRANSPORT NETWORKS

RELATED APPLICATION

U.S. patent application Ser. No. 09/474,722 was filed concurrently herewith.

TECHNICAL FIELD

This invention relates to optical transport networks and, more particularly, to optical channel overhead.

BACKGROUND OF THE INVENTION

It has been determined that it is desirable to provide some latency insensitive, optical channel non-associated optical channel overhead. That is, overhead that does not necessarily have to follow a particular optical channel connection. It has also been determined that is also desirable to provide some optical channel associated optical channel (OCh) overhead (OH). One such arrangement for providing channel associated optical channel overhead is disclosed in co-pending United States Patent application Serial No. (Ballintine-Bonenfant 3-1) noted above and assigned to the assignee of the instant application. The Ballintine-Bonenfant 3-1 application discloses use of a unique digital wrapper arrangement that carries the optical channel associated overhead. Although the digital wrapper functions satisfactorily in many applications, the corresponding associated OCh-OH is typically only available at locations where optical-electronic regenerators are installed. However, it is unlikely that regenerators will be employed at every optical network element in the optical transport network (OTN). Consequently, there was no way to extend OCh maintenance boundaries beyond so-called sub-networks. It is also noted that there are optical network elements that do not terminate the OCh but perform OCh-level maintenance functions. Consequently, there is a need to be able to also carrier OCh-OH information to these optical network elements, where regenerators are usually located.

SUMMARY OF THE INVENTION

Problems and limitations of other arrangements for carrying optical channel overhead are overcome by carrying individual optical channel overhead information in a message based channel on an optical supervisory channel. Specifically, this is realized by obtaining performance monitoring, and/or performance measurement, and/or operations, and/or administration, and/or maintenance information, and/or the like for the individual ones of one or more optical channels, formatting the obtained information into a message for each individual optical channel and inserting the resulting message(s) into an optical supervisory channel (OSC) to be transported on the OTN.

In one embodiment of the invention, particular overhead information is formatted into a message and controllably inserted into the optical supervisory channel at a prescribed optical network element to be transported on the OTN.

In another embodiment of the invention, particular overhead information is formatted into a message and controllably inserted into the optical supervisory channel at a prescribed optical network element to be transported on the OTN to a node including the capability to insert the overhead information into channel associated optical channel overhead to be transported to a network element at which it may be removed. Additionally, overhead information transported in channel associated optical channel overhead may be extracted, formatted into a message and inserted in a message based channel in the OSC. The OSC transports the optical channel overhead to a particular node not equipped for associated overhead insertion or removal, where it is extracted form the OSC and used as desired.

BRIEF DESCRIPTION OF THE DRAWINGS

FIG. 7 graphically illustrates one example of a basic frame structure for the optical channel employing the digital wrapper;

FIG. 8 graphically illustrates one example of a multiframe structure for the optical channel-overhead (OCh-OH);

DETAILED DESCRIPTION

At the outset, it should be noted that in optical transport networks network elements are employed that do not terminate the optical channel (OCh), but do perform OCh-level maintenance functions. A specific example is of an optical network element that detects an abnormal condition and is required to assert a so-called "Forward Defect Indicator (FDI)". An FDI is a message generated by an OCh processing unit that is used to inform downstream equipment that an OCh is defective. Each FDI indicates the affected OCh and, optionally, also indicates the root cause of the defect. In another example, an FDI is generated when an optical cross connect detects either a cross point failure or misconnection and is required to assert an OCh-FDI indicating the defect. In any of these situations it is clear that some optical channel overhead (OCh-OH) information will be required to be transported from network element locations at which the OCh Associated overhead is not available. The only available path to transport the OCh-OH information is the Optical Supervisory Channel (OSC). Consequently, we have determined that some OCh-OH is required to be transported via the non-associated OSC. As indicated below, in this particular example, the OCh-FDI may be transported on the OSC at least to a node that has access to OCh associated overhead for that particular OCh. Note that the OCh associated overhead is "associated" with a particular OCh, while the OCh non-associated overhead is transported by the OSC that is not associated with a particular OCh. These situations regarding the OCh-OH being transported on non-associated OSC and then being transferred to being transported on an associated digital wrapper in the particular OCh are clearly illustrated in FIG. 1 and described below.

Figure 1:
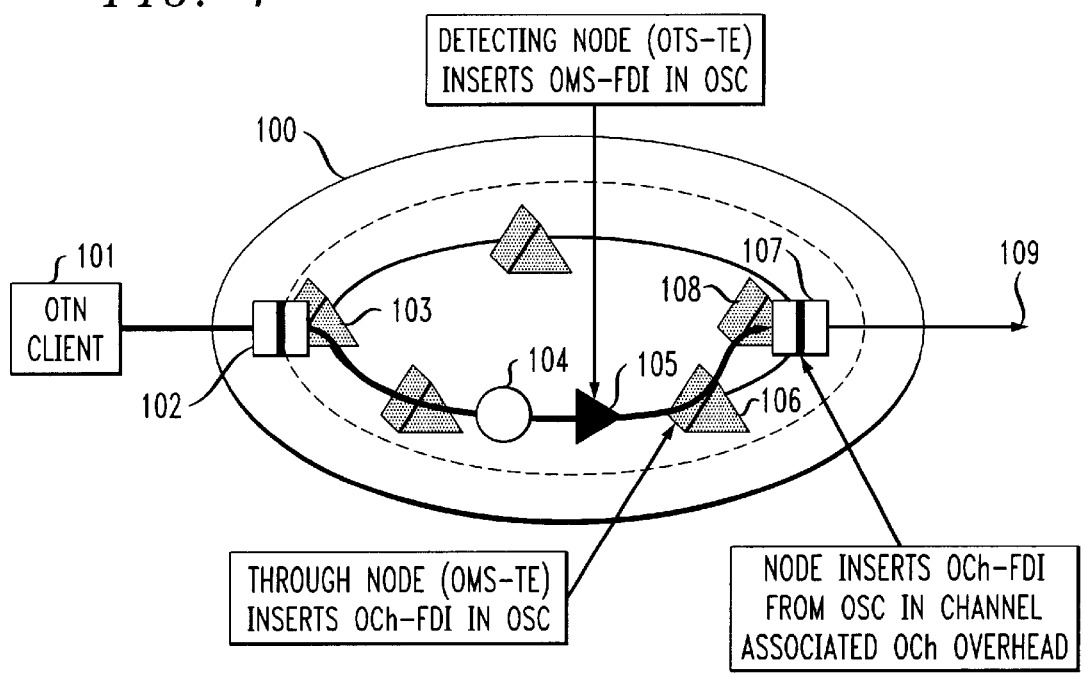
FIG. 1 shows, in simplified form, an example application of an embodiment of the invention in a sub-network in an optical transport network.

FIG. 1 illustrates, in simplified form, an optical sub-network 100 employed in an optical transport network (OTN), for example, an optical network employing wavelength division multiplexing (WDM) of optical signals, in which the invention can advantageously be employed. Specifically, shown is an OTN client 101 that in this example, accesses optical sub-network 100 via optical-electronic processing unit (OEPU) 102 in or at optical add-drop multiplexer (OADM) 103 in a ring subnetwork 110 including a plurality of nodes each having an OADM. In this example, OEPU 102 allows for the insertion and removal of the overhead carried in channel associated OCh-OH, for example, by a digital wrapper added to the optical channel client signal payload envelope, as well as, the availability of accurate client performance information at the sub-network 110 boundary. As such, the digital wrapper is associated with its related optical channel and, thus, carries the optical channel associated optical channel overhead. However, as indicated above, the channel associated OCh overhead is not accessible or able to be inserted or extracted at all network elements. Consequently, if there is a need to obtain performance monitoring, and/or performance measurement, and/or operations, and/or administration, and/or maintenance information, and/or the like for the individual ones of one or more optical channels at position 104, it must be obtained at a so-called detecting node 105. Node 105 is an optical transmission section terminating equipment (OTS-TE) that may generate and insert an optical multiplex section (OMS) forward defect indicator (FDI) into the OSC. It is noted that an OTS-TE is an element that processes the aggregate optical signal that contains all of the OChs. A common example of an OTS-TE is a set of optical amplifiers with an appropriate controller that is used as repeaters. Then, node 106 is a through node (OMS-TE) and has the capability to insert OCh-FDI in the OSC. Note that an OMS-TE actually separates the individual OChs, so that they be processed individually, either optically or electronically. OEPU 107 located in or at node 108 has the capability to obtain the OCh-FDI from the OSC and insert it in optical channel associated OCh overhead (OCh-OH). Additionally, at OEPU 107 associated with OADM 108 the overhead information carried by the digital wrapper can be accessed to obtain accurate client performance information. The optical signal is then supplied as an output at 109. It is further noted that at certain nodes only an optical processing unit (OPU) is available and, consequently, the OCh-OH is carried to and from them by non-associated OSC.

Figure 2:
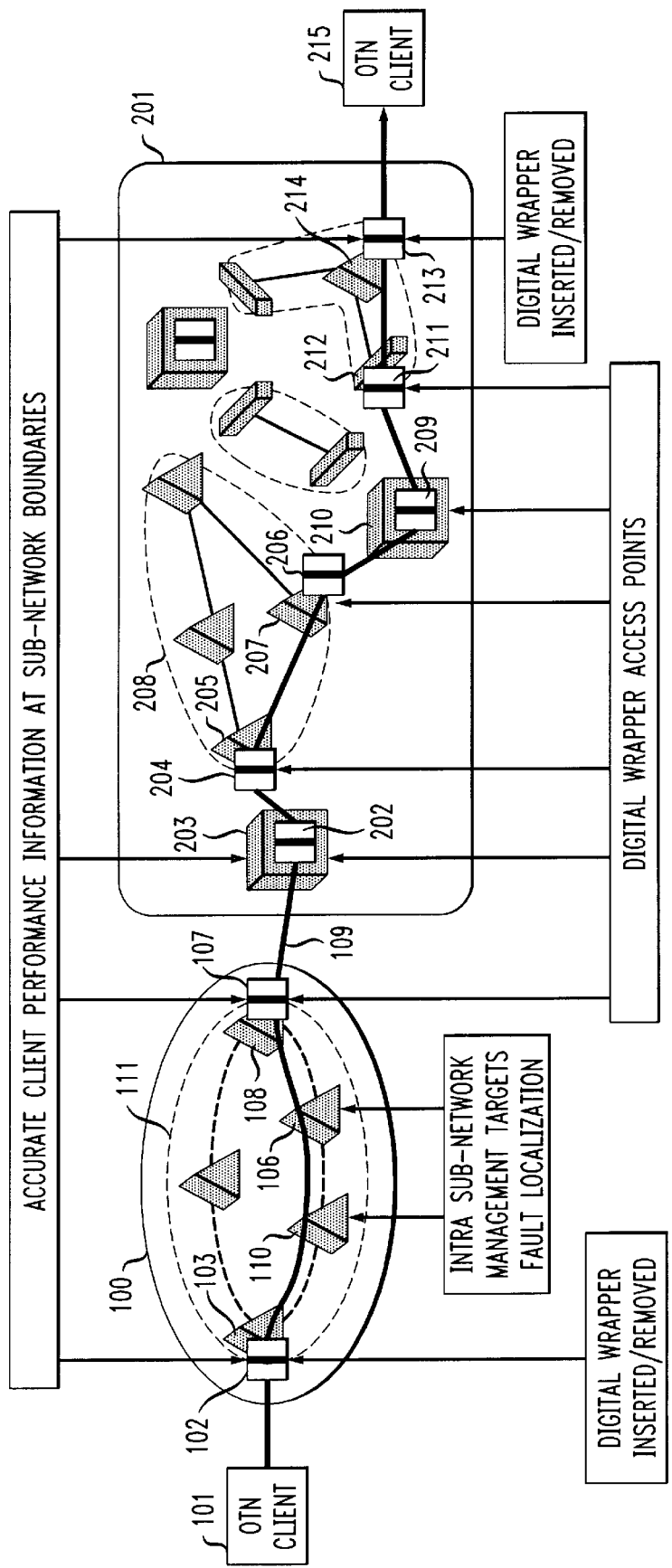
FIG. 2 illustrates in simplified form a communication system including an optical transport network in which the invention can advantageously be employed.

FIG. 2 illustrates, in simplified form, an optical transport network (OTN) 200, for example, an optical network employing wavelength division multiplexing (WDM) of optical signals, in which the invention can advantageously be employed. Specifically, shown is optical sub-network 100 that was described above in relationship to FIG. 1, and will not be described again in detail. It is again noted that the digital wrapper is associated with its related optical channel and, thus, carries the optical channel associated optical channel overhead. At OEPU 107 associated with OADM 108 the information carried by the digital wrapper can be accessed to obtain accurate client performance information. The OCh including the associated OCh-OH carried in the digital wrapper is transported via 109 to OTN 201 and therein to OEPU 202. It is noted, that the digital wrapper information is accessible to obtain accurate client performance information at each of OEPUs 202, 204, 206, 209 and 211 associated with cross connect 203, OADM 205, OADM 207, cross connect 210, and optical line system 212, respectively. Again, OADM 205 and OADM 207 are part of ring network 208. At OEPU 213 associated with OADM 214 the information carried by the digital wrapper can be inserted or removed in association with OTN client 215. Additionally, accurate client performance information is also available at OEPUs 102 and 213. Thus, as seen, the desirable client signal performance information is obtainable at each of the network elements where associated overhead transport is not available through use of the OSC and, which is then made available at each of the sub-network boundaries by use of the digital wrapper, in accordance with this invention. As is described below, end-to-end OCh performance is obtained by employing bit interleaved parity. While incremental performance is obtained by employing forward error correction (FEC).

It should be noted, that the optical layers in an optical signal include an optical channel (OCh) layer, optical multiplex section (OMS) and optical transmission section (OTS). The OCh layer includes digital container 600 (FIG. 6), which in accordance with the invention, includes a client signal payload envelope having OCh payload bandwidth, and a digital wrapper 604 having OCh-OH bandwidth and FEC data bandwidth. Note that the digital wrapper 604 is "around" the OCh payload envelope bandwidth that transports a client signal that floats in the payload envelope. In this example, the client signals may include SONET (synchronous optical network), SDH (synchronous digital hierarchy), ATM (asynchronous transfer mode), FDDI (fiber data distribution interface), SDL (simple data link), IP (internet protocol), GbE (gigabit ethernet), PDH (plesiochronous digital hierarchy) or the like. Details of digital wrapper 604 are described in more detail below.

Figure 3:
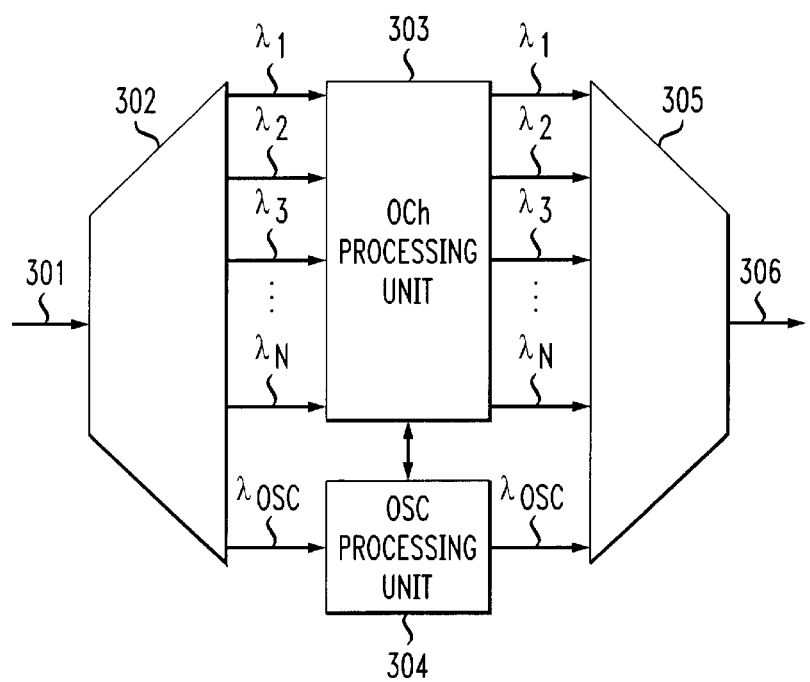
FIG. 3 shows, in simplified block diagram form, details of an optical channel overhead processing unit that may be employed in an embodiment of the invention.

FIG. 3 shows, in simplified block diagram form, details of an optical channel overhead processing unit 300 that may be employed in an embodiment of the invention. Note that for simplicity and clarity of exposition only one direction of transmission is shown. It will be apparent to those skilled in the art that a similar embodiment of the invention can be utilized for another direction of transmission in a typical bidirectional optical transmission system. An incoming optical signal is supplied via input terminal 301 to optical demultiplexer 302, which yields a set of wavelengths including $\lambda_1 \ldots \lambda_N$ for transporting client optical signals and a dedicated wavelength $\lambda_{OSC}$ for transporting an Optical Supervisory Channel (OSC). Typically, the OSC has a fixed bandwidth that is partitioned OTS, OMS and some message-based OCh-OH that is scaleable with the value of N, where N is the number of wavelengths provided to transport client optical signals. The set of wavelengths $\lambda_1, \ldots \lambda_N$ is supplied to OCh processing unit 303, which may include optical-electronic processing units, optical processing units or both. The OCh processing unit 303 may include a passive switch matrix, e.g., an optical add drop multiplexer (OADM), optical cross connect (OXC), optical-electronic processing including processing of associated OCh-OH, or the like, optical amplification, optical monitoring, spectral analysis, power monitoring or the like. It is noted that the optical-electronic processing units are employed to process so-called channel associated OCh overhead at locations where regenerators are available, and are further described below in relationship to FIG. 5. The optical processing units are employed to perform optical overhead functions at locations where no regenerators are available. Under control of OSC processing unit 303, the OCh overhead is either inserted in or removed from the OSC and/or inserted in or removed from the channel associated OCh overhead carried in a so-called digital wrapper associated with the particular optical channels, as described below. Again, note that the overhead information inserted as a message in the OSC on wavelength $\lambda_{OSC}$ relates to information obtained by performance monitoring, and/or performance measurement, and/or operations, and/or administration, and/or maintenance information, and/or the like for the individual ones of one or more optical channels. Note the OCh-OH information may be carried in a so-call forward defect indicator (FDI). This overhead information including any FDI for the particular OChs is formatted into a message for each individual optical channel and the resulting message(s) are inserted into the optical supervisory channel to be transported on the OTN. After processing, the set of wavelengths $\lambda_I, \ldots \lambda_N$ along with the dedicated OSC wavelength $\lambda_{OSC}$ are supplied to optical multiplexer 305 where they are recombined into an optical signal for transport at output terminal 306. In one example, wave division demultiplexing and multiplexing are advantageously employed in demultiplexer 301 and multiplexer 305, respectively.

Figure 4:
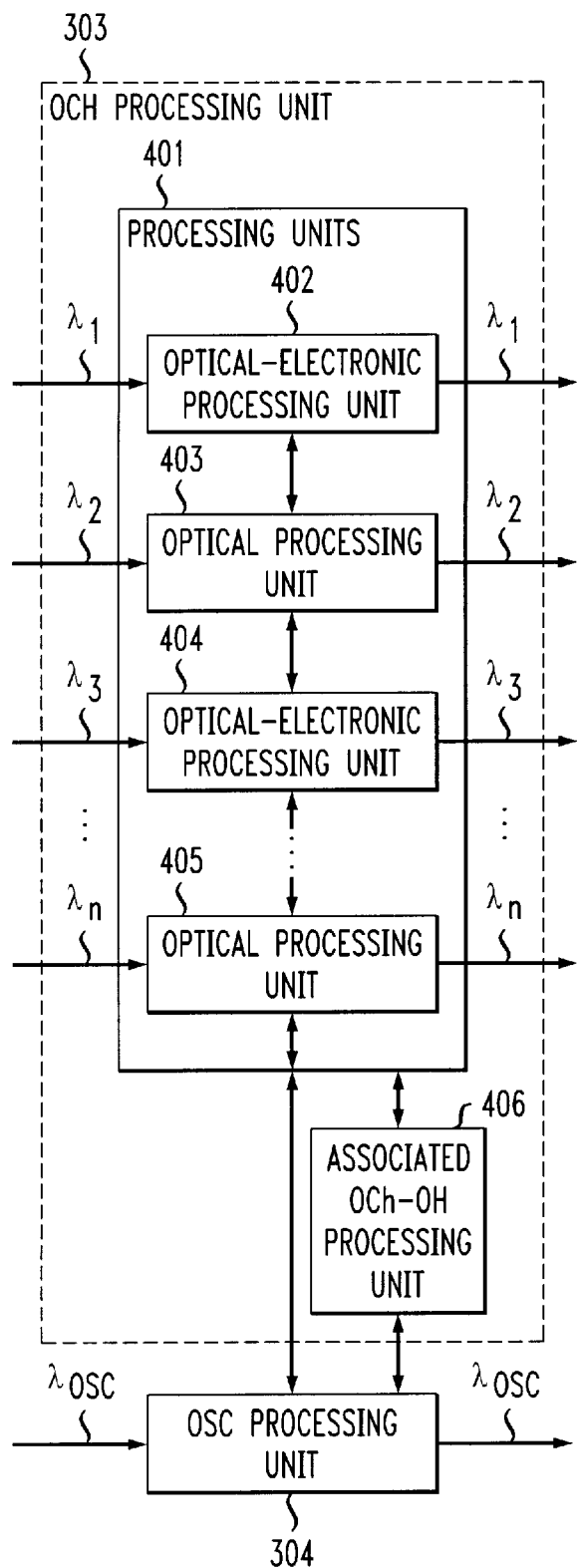
FIG. 4 shows, in simplified block diagram form, details of the optical channel processing unit and optical supervisory processing unit employed in the optical channel overhead processing unit of FIG. 3.

FIG. 4 shows, in simplified block diagram form, details of the OCh processing unit 303 and optical OSC processing unit 304 employed in the OCh processing unit 300 of FIG. 3. Specifically, in this example, OCh processing unit 303 includes processing units 401 that may include N units equal to the number of incoming optical wavelengths $\lambda_I, \ldots \lambda_N$, and associated OCh-OH processing unit 406. Processing units 401 may include all optical processing units (403, 405), all optical-electronic processing units (402, 404) or a combination of both. It is noted that if a network element is co-located with a regenerator, it may be desirable to have optical-electronic processing units so that the OCh-OH for an optical channel may be inserted in and/or removed from a digital wrapper associated with the OCh via associated OCh-OH processing unit 406. This may occur by first removing the OCh-OH from the OSC via OSC processing unit 304 and supplying it to associated OCh-OH processing unit 406 for insertion into the OCh associated digital wrapper via optical-electronic processing units (OEPUs), in this example, 402 and 404, which are further described below. To this end, OEPUs 402 and 404 are connected to associated OCh-OH processing unit 406. As indicated above, optical processing units (OPUs) 403 and 405 provide the overhead information to be inserted as a message in the OSC on wavelength $\lambda_{OSC}$. To this end, OPU units 403 and 405 are connected to OSC processing unit 304. This OCh information relates to information obtained by performance monitoring, and/or performance measurement, and/or operations, and/or administration, and/or maintenance information, and/or the like for the individual ones of one or more optical channels, typically, at locations where the optical-electronic processing units have not been deployed. Again, the OCh-OH information may be in the form of a FDI. This overhead information including any FDI for the particular OChs is formatted into a message for each individual optical channel and the resulting message(s) are inserted into the OSC on wavelength $\lambda_{OSC}$ via OSC processing unit 304 to be transported on the OTN.

In certain applications, the OCh-OH may be transported via the associated digital wrapper to an OEPU, for example, OEPU 204, where it is removed via associated OCh-OH processing unit 406 and supplied to OSC processing unit 304. In turn, OSC processing unit 304 formats the OCh-OH into a message and inserts it into the message based channel in the OSC. Then, the OSC transports the OCh-OH to, for example, node 208, where the OCh-OH is extracted and used as desired.

Figure 5:
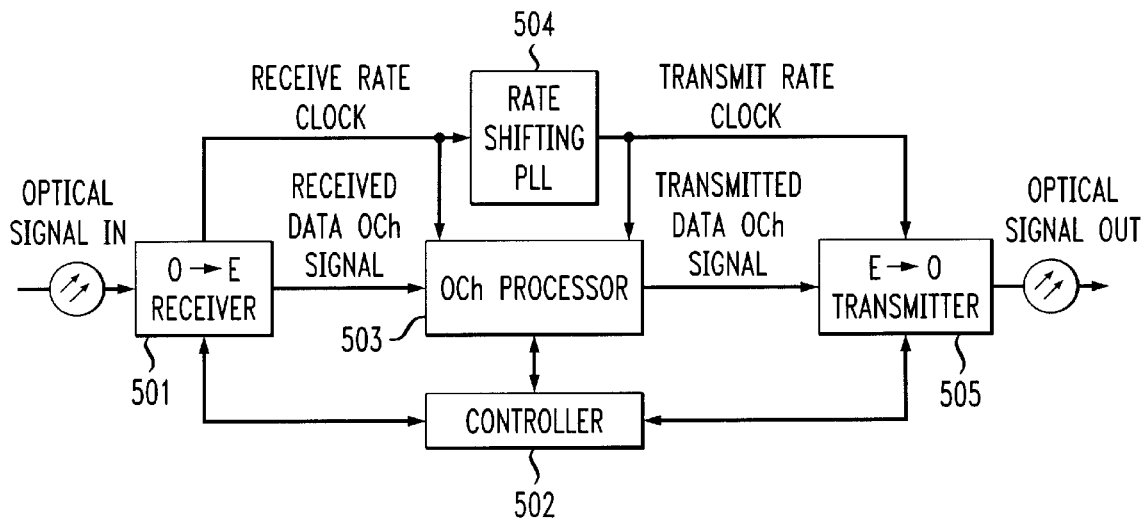
FIG. 5 shows, in simplified form, an optical-electronic processor that may be employed in an embodiment of the invention.
Figure 6:
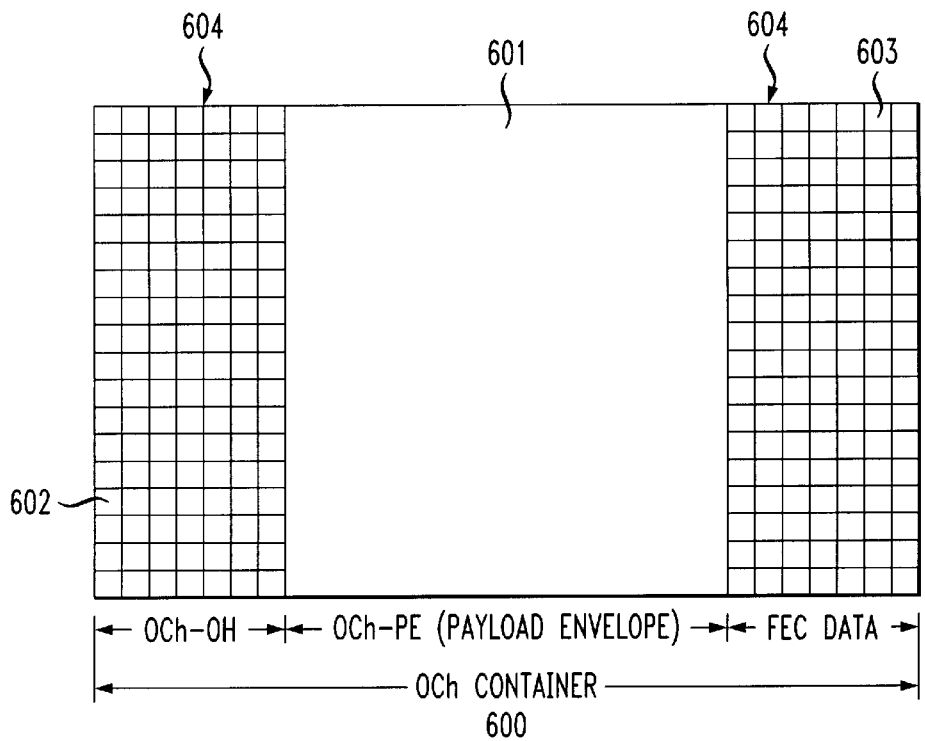
FIG. 6 shows a graphical representation of an optical channel (OCh) container including a digital wrapper that may be employed in an embodiment of the invention.

FIG. 5 shows, in simplified form, an optical-electronic processor 500 in which an embodiment of the invention can be implemented. For simplicity and clarity of exposition only one direction of transmission is shown and described here. It will be apparent to those skilled in the art that the transmission of optical signals in a practical transport network may require bidirectional transmission. Specifically, incoming optical signals including optical channels carrying client signals are received via optical receiver 501. Optical receiver 501 includes apparatus for, in this example, converting the received optical signal into an electrical signal, extracting a client data signal and a received clock rate under control of controller 502, in well known fashion. Such optical receivers are known in the art. The received client data signal and received clock rate are supplied to OCh processor 503. As shown in FIG. 6, OCh processor 503, in accordance with the invention, allocates, i.e., adds, the OCh digital wrapper 604 including overhead bandwidth 602 and FEC data bandwidth 603 to payload envelope 601 that carriers the OCh client signal to form OCh container 600. This is realized by allocating, i.e., generating, a client signal payload envelope bandwidth 601, and allocating and adding additional bandwidth to the client signal pay load envelope 601 to carry the OCh-OH 602, which in this example, includes OCh-Path overhead, OCh-Domain overhead and OCh-Path overhead. The domain may be, for example, a tandem connection. Bandwidth may also be allocated and added to carry forward error correction (FEC). Further details of one example of a FEC arrangement that may be advantageously employed in this embodiment of the invention is described in ITU-T G.975 dated November 1996 and entitled "Forward error correction for submarine systems". The digital wrapper 604 is added "around" the client payload envelope bandwidth 601 in the sense that, in this example, the OCh-OH bandwidth 602 is added to one side of the payload envelope bandwidth 601 and the FEC bandwidth 603 is added to the other side of the payload envelope bandwidth 601, as shown in FIG. 6.

As indicated, the client signal is inserted in the optical channel signal such that it "floats" in the digital container 600 payload envelope 601. Indeed, the format of the OCh client signal is only constrained by the OCh container 600 format. The client signal need only be a constant bit-rate digital signal within the bandwidth of a so-called 3R regenerator function. As such, the OCh payload envelope 601 can be viewed as a client signal format independent, constant bit-rate channel. Note that the 3R regenerator function denotes regeneration/amplification, reshaping and retiming at sub-network and administrative domain boundaries to provide required OCh performance monitoring and to effect hand-off of a clean signal between operators. Apparatus for effecting such regeneration functions is known in the art. If should be further noted, that an advantage of employing a digital wrapper, in accordance with the invention, is that as new client signal formats emerge they can be transported, without the need for any changes to OTN 100. It is noted, however, that client signal-specific apparatus may be required to process the new client signals.

Another advantage of the invention is that through use of the digital wrapper invention, including use of FEC, improves the optical performance of OTN 100. By using FEC, 3R regenerators can accommodate poorer signal to noise ratios. Consequently, a given optical amplifier can provide some combination of increased span length, number of spans, or number of optical channels.

FIG. 7 graphically illustrates one example of a basic frame structure that can be used for the optical channel. As shown, each sub-frame includes OCh-OH, Payload and Check Bytes. Each cell in the frame represents one byte and the numbers in the cells indicate the order of transmission of each byte. One such frame structure is described in the ITU-T G.975 document cited above.

FIG. 8 graphically illustrates one example of a multiframe, i.e., superframe, structure for the optical channel-overhead (OCh-OH). Since the basic frame structure described in G.975 includes only 16 bytes to carry overhead, the multiframe structure is employed for carrying the OCh-OH to allow sufficient flexibility for assigning overhead functions. The superframe structure shown provides 64 time slots that can be allocated among framing, parity check bytes and miscellaneous OCh-OH functions. One column of the OCh-OH multiframe, namely, frame 4, is allocated for end-to-end performance monitoring, in this example, between OEPU 102 and OEPU 211 (FIG. 2). In this example, a bit error rate (BER) indication is obtained by using bit-interleaved parity (BIP). The FEC process that is employed in the OCh, in this example, is used for performance monitoring on individual segments between FEC sites, for example, a segment between OEPU 202 and OEPU 205 (FIG. 2).

Returning to FIG. 5, rate shifting phase locked loop (PLL) 504 in response to the received clock rate generates a desired transmit clock rate that is supplied to OCh processor 503 and optical transmitter 505. OCh processor 503 adds the digital wrapper 604, in accordance with the invention, around the client signal payload envelope under control of controller 502. The formatted optical channel signal including the digital wrapper, is supplied at the transmit rate clock to optical transmitter 505, where it is converted to optical form and inserted in the optical channel layer of the transported optical signal. Again, such transmitters including electrical-to-optical converters and apparatus for formatting the optical signal for transmission are well known in the art.

Figure 9:
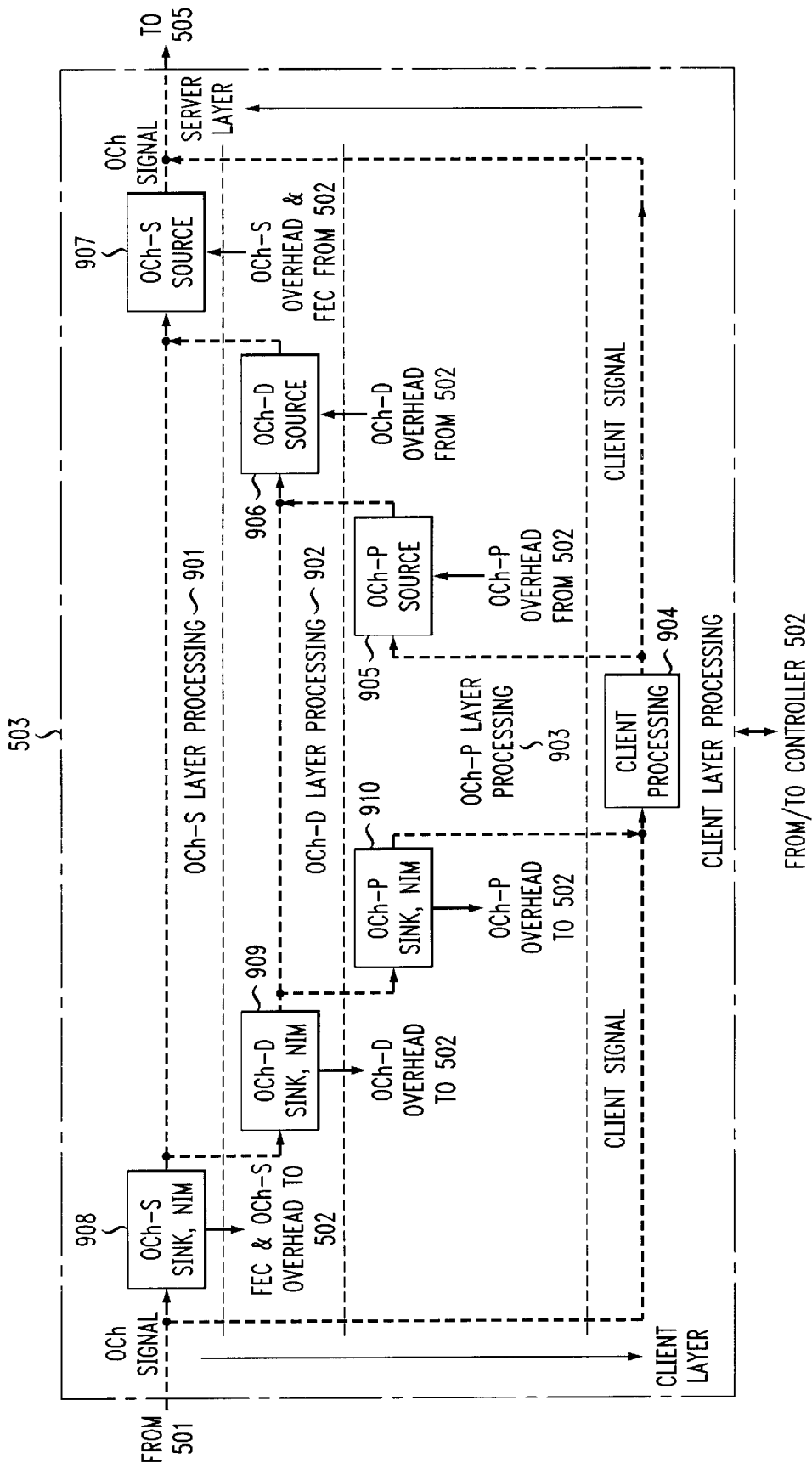
FIG. 9 illustrates the overall data flow for the OCh processor employed in the optical-electronic processor of FIG. 5.

FIG. 9 illustrates the overall data flow in the optical-electronic processor 500 and, specifically, in OCh processor 503 of FIG. 5. Specifically, shown are OCh-S layer processing 901, OCh-D layer processing 902, OCh-P layer processing 903 and client processing unit 904. Also shown are OCh-P layer source unit 905, OCh-D layer source unit 906, OCh-S layer source unit 907, OCh-S layer sink and non-intrusive monitor unit 908, OCh-D layer sink and non-intrusive monitor unit 909 and OCh-P layer sink and non-intrusive monitor unit 910. The possible signal flow paths are shown in dashed outline. An electrical version of the OCh signal from receiver 501 (FIG. 5), including the digital wrapper 600 that carries the OCh section layer, domain layer and path layer overhead, and the FEC performance monitoring information, is available to be supplied to OCh-S layer sink and non-intrusive monitor unit 908, and to client processing unit 904. The OCh-S layer overhead and FEC monitoring information can be extracted by OCh-S layer sink and non-intrusive monitor unit 908. Possible section layer signal flow with the OCh section overhead and FEC monitoring information removed is from OCh-S layer sink and non-intrusive monitor unit 908 to OCh-S layer source unit 907 and to OCh-D layer sink and non-intrusive monitor unit 909. The OCh-D layer overhead can be extracted by OCh-D layer sink and non-intrusive monitor unit 909. Then, possible domain layer signal flow is from OCh-D layer sink and non-intrusive monitor unit 909 to OCh-D layer source 906 and to OCh-P layer sink and non-intrusive monitor unit 910. The OCh-P layer overhead can be extracted by OCh-P layer sink and non-intrusive monitor unit 910. Then, possible path layer signal flow is from OCh-P layer sink and non-intrusive monitor unit 910 to client processing unit 904. As indicated above, an OCh client signal can also be supplied from receiver 501 to client processing unit 904. A processed OCh client signal can be supplied as an output to transmitter 505 and to OCh-P layer source unit 905, where OCh-P layer overhead can be inserted. Then, the OCh client signal including OCh-P layer overhead can be supplied to OCh-D layer source unit 906, where OCh-D layer overhead can be inserted. The OCh client signal including OCh-P layer overhead and OCh-D layer overhead can be supplied to OCh-S layer source unit 907, where OCh-S layer overhead can be inserted and FEC monitoring information may also be inserted. This results in the OCh client signal having a digital wrapper, in accordance with the invention, wrapped around the payload envelope carrying it. The resulting OCh signal is supplied to transmitter 505 for conversion to optical form for transmission.

Figure 10:
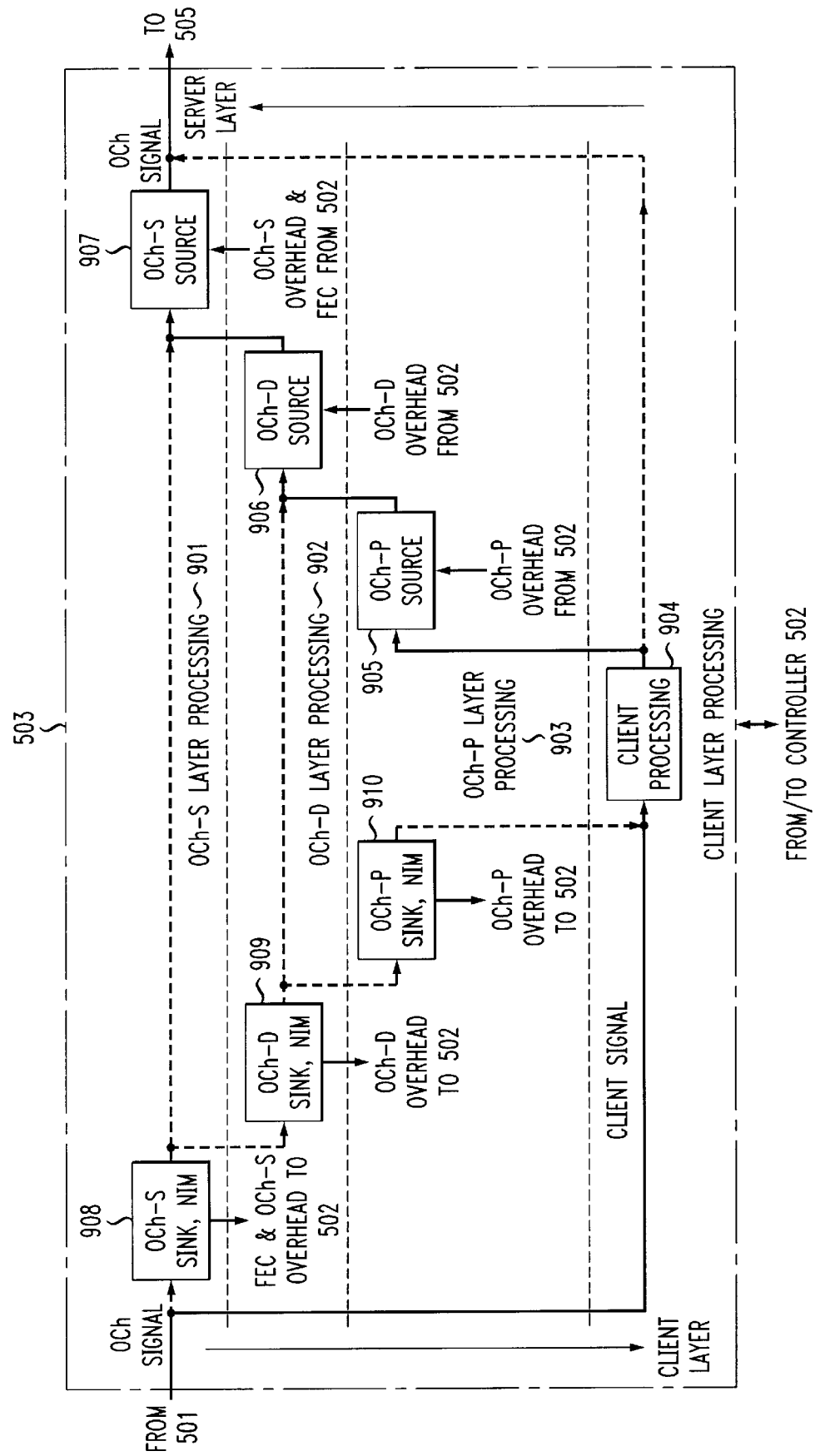
FIG. 10 illustrates the signal flow for a digital wrapper insertion mode of the optical-electronic processor of FIG. 5.

FIG. 10 illustrates the signal flow for a digital wrapper insertion mode in the optical-electronic processor 500 and, specifically, OCh processor 503 of FIG. 5. Note that elements of OCh processor 503 that are identical to those shown in FIG. 9 have been similarly numbered and will not be described again in detail. Then, a digital wrapper, in accordance with the invention, is inserted in the OCh signal by surrounding a client signal in a payload envelope with the OCh-P layer overhead, OCh-D layer overhead, OCh-S layer overhead and FEC monitoring information as shown in FIG. 6, and described above. This is realized by a client signal being supplied to client processing unit 904 and, then, to OCh-P layer source 905 where the OCh-P layer overhead is inserted. Then, OCh-D layer overhead is inserted by OCh-D layer source 906 to yield a client signal surrounded by both the OCh-P layer and the OCh-D layer overhead. This combined signal is supplied to OCh-S layer source 907 where the OCh-S layer overhead and the FEC monitoring information is inserted to yield the OCh container 600 as shown in FIG. 6. The resulting OCh signal is supplied as an output to transmitter 505 where it is converted into optical form for transmission.

Figure 11:
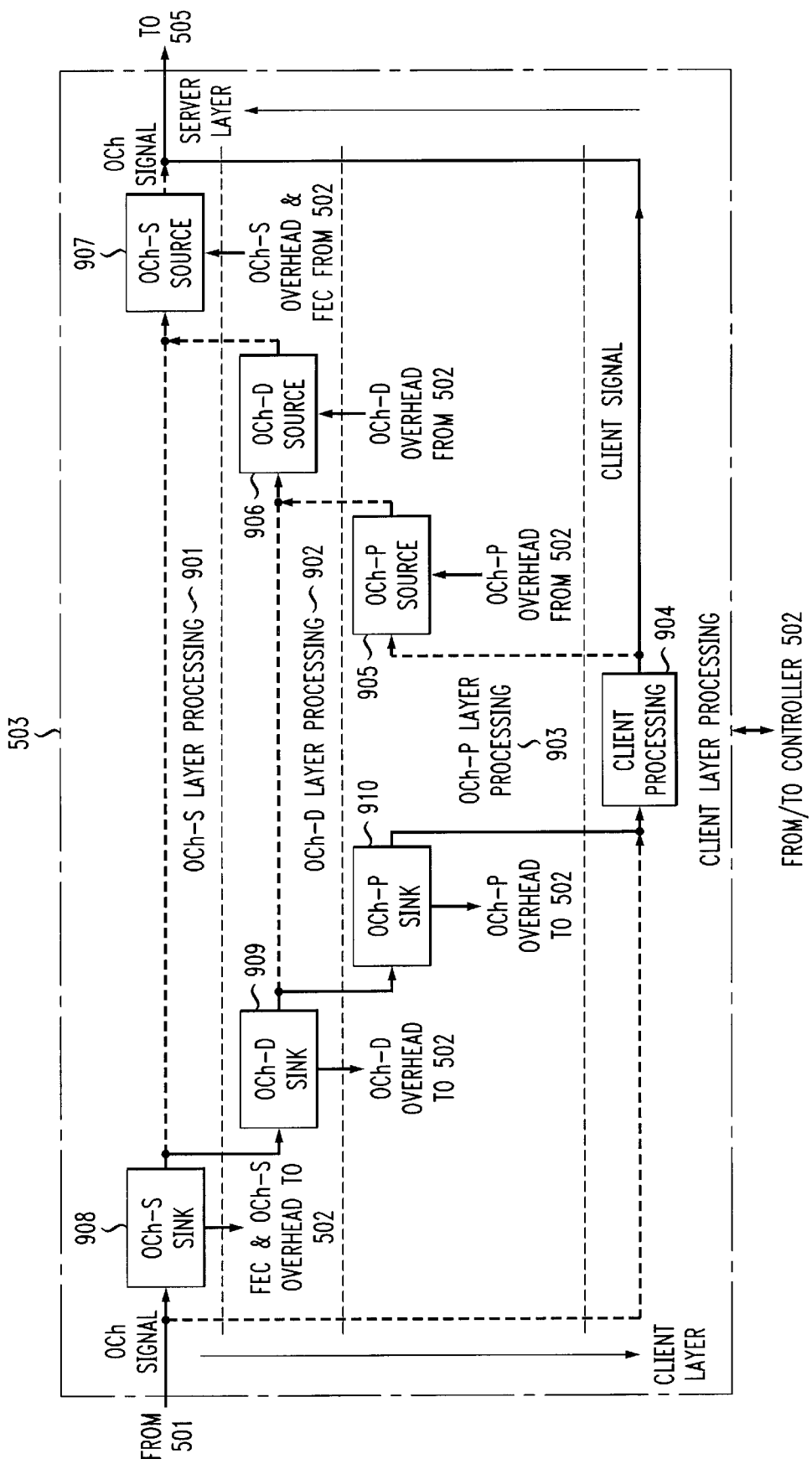
FIG. 11 illustrates the signal flow for a digital wrapper removal mode of the optical-electronic processor of FIG. 5.

FIG. 11 processor 500 and, specifically, OCh processor 503 of FIG. 5. Note that elements of OCh processor 503 that are identical to those shown in FIG. 9 have been similarly numbered and will not be described again in detail. Then, a digital wrapper, in accordance with the invention, is removed by supplying an electrical version of an OCh signal from receiver 501 to OCh-S layer sink 908 where the FEC monitoring information and the OCh-S layer overhead is removed. Then, the OCh-D layer overhead is removed by OCh-D layer sink 909 and the OCh-P layer overhead is removed by OCh-P layer sink 910. The resulting client signal is supplied to client processing unit 904. In turn, the processed client signal is supplied as an output to transmitter 505.

Figure 12:
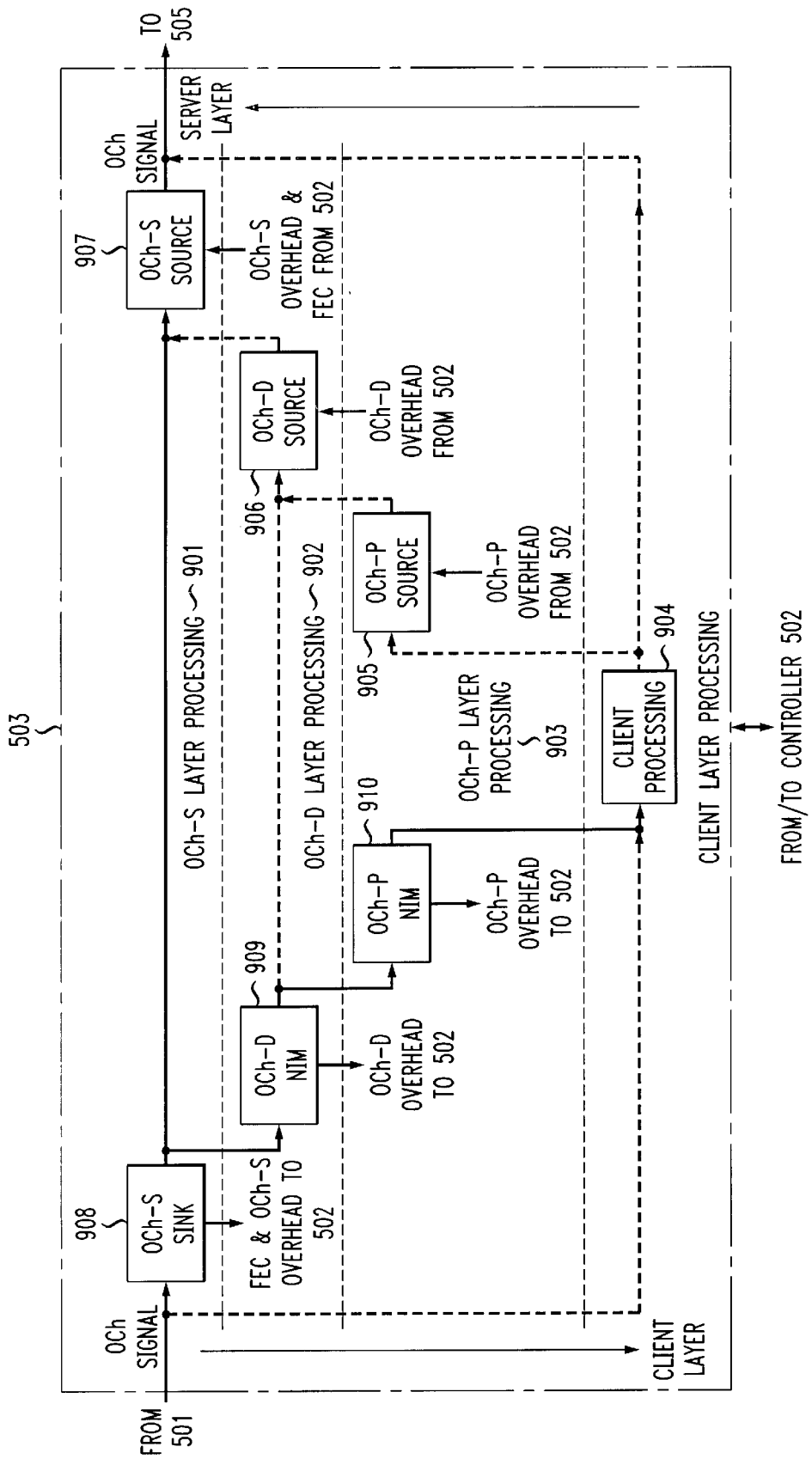
FIG. 12 illustrates the signal flow for the digital wrapper OCh-S layer access in the optical-electronic processor of FIG. 5.

FIG. 12 illustrates the signal flow for the digital wrapper OCh-S layer access in the optical-electronic processor and, specifically, OCh processor 503 of FIG. 5. Note that elements of OCh processor 503 that are identical to those shown in FIG. 9 have been similarly numbered and will not be described again in detail. Then, an electrical version of the OCh signal is supplied to OCh-S layer sink in 908, where the FEC monitoring information and the OCh-S layer overhead can be removed. The resulting signal is supplied to OCh-S layer source 907, where OCh-S layer overhead and FEC monitoring information is inserted, and to OCh-D layer non-intrusive monitor in 909, where the OCh-D layer overhead can be accessed. A signal from OCh-D layer non-intrusive monitor 909 is supplied to OCh-P layer non-intrusive monitor in 910, where the OCh-P layer overhead can be accessed. The OCh signal including the digital wrapper, in accordance with the invention, from OCh-S layer source 907 is supplied as an output to transmitter 505 where it is converted to optical form for transmission.

Figure 13:
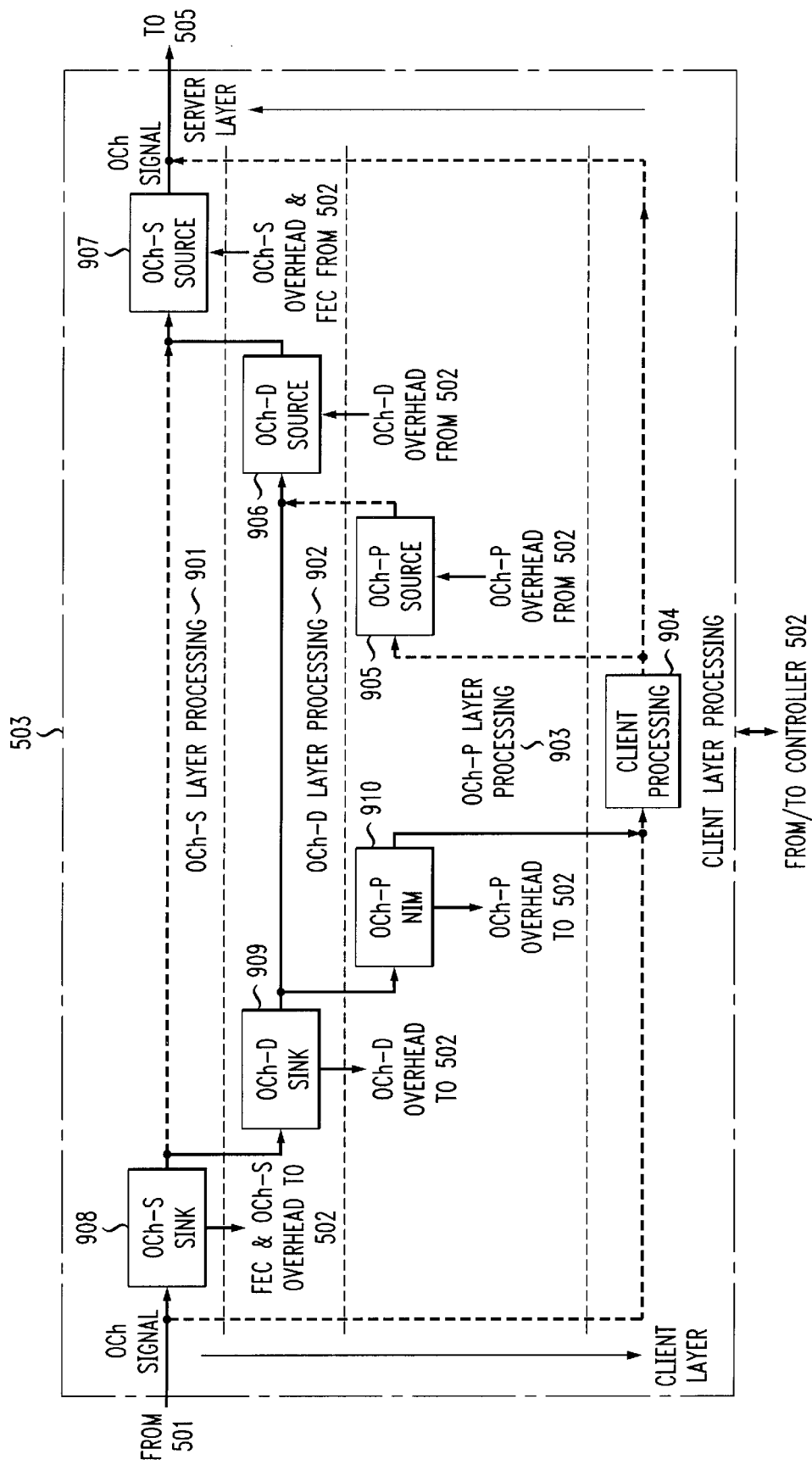
FIG. 13 illustrates the signal flow for the digital wrapper OCh-S & OCh-D layer access in the optical-electronic processor of FIG. 5.

FIG. 13 illustrates the signal flow for the digital wrapper OCh-S & OCh-D layer access in the optical-electronic processor and, specifically, OCh processor 503 of FIG. 5. Note that elements of OCh processor 503 that are identical to those shown in FIG. 9 have been similarly numbered and will not be described again in detail. Then, an electrical version of the OCh signal is supplied to OCh-S layer sink in 908, where the FEC monitoring information and the OCh-S layer overhead can be removed. A resulting signal is supplied to OCh-D layer sink in 909, where the OCh-D layer overhead can be removed. The resulting signal from OCh-D layer sink and non-intrusive monitor in 909 is supplied to OCh-D layer source 906, where OCh-D layer overhead can be inserted, and to OCh-P layer non-intrusive monitor in 910 where the OCh-P layer overhead can be accessed. A resulting signal from OCh-P layer sink and non-intrusive monitor 910 is supplied to client processing unit 904. The resulting signal from OCh-D layer source 906 is supplied to OCh-S layer source 907, where the OCh-S layer overhead and the FEC monitoring information can be inserted to yield an OCh signal including the digital wrapper, in accordance with the invention, which is supplied as an output to transmitter 505 where it is converted into optical form for transmission.

The above-described embodiments are, of course, merely illustrative of the principles of the invention. Indeed, numerous other methods or apparatus may be devised by those skilled in the art without departing from the spirit and scope of the invention.

What is claimed is:

1. Apparatus for use in transporting optical channel overhead information comprising:
    a processor for obtaining optical channel overhead information for each individual optical channel of one or more optical channels;
    a formatter for formatting said obtained optical channel overhead information into one or more prescribed messages. related on a one-to-one basis with said one or more optical channels; and
    an inserter for inserting said one or more messages into a message based optical channel overhead bandwidth portion of an optical supervisory channel, said optical supervisory channel including said one or more messages being supplied as an output to be transported on an optical signal.

2. The invention as defined in claim 1 wherein said optical signal includes one or more wavelength division multiplexed optical channels each having a prescribed wavelength.

3. The invention as defined in claim 1 wherein said optical supervisory channel has a fixed bandwidth.

4. The invention as defined in claim 3 wherein said fixed bandwidth includes said message based optical channel bandwidth portion, which bandwidth portion is scaleable depending on a number of said optical channels each having a prescribed wavelength.

5. The invention as defined in claim 1 wherein said processor obtains information whether an optical channel is defective and includes a generator for generating a forward defect indicator (FDI) message, said FDI message indicating the affected optical channel.

6. The invention as defined in claim 5 wherein said generator generates said FDI message such that it indicates the cause of said defect in said optical channel.

7. Apparatus for use in transporting optical channel overhead information over an optical transport network (OTN) comprising:
    an optical supervisory channel processor including a first extractor for extracting overhead information related to at least one optical channel from an optical supervisory channel of an incoming optical signal; and
    an associated optical channel overhead processor, supplied with said overhead information extracted from said supervisory channel, for supplying said overhead information extracted from said supervisory channel to a processing unit associated with a particular optical channel, said processing unit including a first inserter for inserting said overhead information extracted from said supervisory channel into prescribed overhead bandwidth directly associated with said particular optical channel, said particular optical channel and associated overhead bandwidth to be transported on an outgoing optical signal over said OTN.

8. The invention as defined in claim 7 wherein said processing unit includes a second extractor for extracting said associated overhead information from said prescribed bandwidth, said processing unit supplying said extracted associated overhead information to said associated optical channel overhead processor, said associated optical channel overhead processor supplying said extracted associated overhead information to said optical supervisory channel processor which includes a second inserter for inserting said extracted associated overhead information into said optical supervisory channel to be transported on an optical signal.

9. The invention as defined in claim 8 wherein said optical supervisory channel processor further includes a formatter for formatting said extracted associated overhead information into a prescribed message and wherein said second inserter inserts said message into a message based optical channel bandwidth portion of a fixed bandwidth of said optical supervisory channel.

10. The invention as defined in claim 7 wherein said processing unit includes an optical channel processor for allocating prescribed bandwidth for a client signal payload envelope and for allocating said overhead bandwidth and for adding said overhead bandwidth to said prescribed bandwidth of said payload envelope bandwidth; and wherein said first inserter inserts said overhead information extracted from said supervisory channel in said overhead bandwidth, wherein said payload envelope bandwidth and said overhead bandwidth form said particular optical channel signal.

11. The invention as defined in claim 10 wherein said optical transport network transports an optical signal including one or more wavelength division multiplexed optical channels.

12. The invention as defined in claim 11 further including a first converter for converting an incoming optical channel from an optical signal to an electrical signal for optical channel overhead processing and a second converter for converting an optical channel overhead processed electrical signal into an optical signal.

13. The invention as defined in claim 10 wherein said prescribed bandwidth of said payload envelope forms a client signal format independent, constant bit-rate transport channel.

14. The invention as defined in claim 7 further including at least one optical processing unit that obtains optical channel overhead information for each individual optical channel of one or more optical channels; and wherein said optical supervisory channel processor includes a formatter for formatting said obtained optical channel overhead information into one or more prescribed messages related on a one-to-one basis with said one or more optical channels and a second inserter which inserts said one or more messages into a message based optical channel overhead bandwidth portion of an optical supervisory channel, said optical supervisory channel including said one or messages being supplied as an output to be transported on an optical signal.

15. The invention as defined in claim 14 wherein said optical supervisory channel has a fixed bandwidth, said fixed bandwidth including said message based optical channel bandwidth portion, which bandwidth portion is scaleable depending on a number of said optical channels each having a prescribed wavelength.

16. The invention as defined in claim 14 wherein said optical processing unit obtains information whether an optical channel is defective and includes a generator for generating a forward defect indicator (FDI) message, said FDI message indicating the affected optical channel.

17. The invention as defined in claim 16 wherein said generator generates said FDI message such that it indicates the cause of said defect in said optical channel.

18. A method for use in transporting optical channel overhead information over an optical transport network (OTN) comprising the steps of:

extracting overhead information related to at least one particular optical channel from an optical supervisory channel of an incoming optical signal; and inserting said overhead information extracted from said supervisory channel into prescribed overhead bandwidth directly associated with said particular optical channel, said particular optical channel and associated overhead bandwidth to be transported on an outgoing optical signal over said OTN.

19. The method as defined in claim 18 further including the steps of extracting said associated overhead information from said prescribed bandwidth, and inserting said extracted associated overhead information into said optical supervisory channel to be transported on an optical signal.

20. The method as defined in claim 19 further including the steps of formatting said extracted associated overhead information into a prescribed message, and inserting said message into a message based optical channel bandwidth portion of a fixed bandwidth of said optical supervisory channel.

21. The method as defined in claim 18 further including the steps of allocating prescribed bandwidth for a client signal payload envelope, allocating said overhead bandwidth, adding said overhead bandwidth to said prescribed bandwidth of said payload envelope bandwidth, and wherein said step of inserting inserts said overhead information extracted from said supervisory channel in said overhead bandwidth, wherein said payload envelope bandwidth and said overhead bandwidth form said particular optical channel signal.

22. The method as defined in claim 21 wherein said optical transport network transports an optical signal including one or more wavelength division multiplexed optical channels.

23. The method as defined in claim 22 further including the steps of converting an incoming optical channel from an optical signal to an electrical signal for optical channel overhead processing, and converting an optical channel overhead processed electrical signal into an optical signal.

24. The method as defined in claim 21 wherein said prescribed bandwidth of said payload envelope forms a client signal format independent, constant bit-rate transport channel.

25. The method as defined in claim 18 further including the steps of obtaining optical channel overhead information for each individual optical channel of one or more optical channels, formatting said obtained optical channel overhead information into one or more prescribed messages related on a one-to-one basis with said one or more optical channels, and said step of inserting inserts said one or messages into a message based optical channel overhead bandwidth portion of an optical supervisory channel, said optical supervisory channel including said one or messages being supplied as an output to be transported on an optical signal.

26. The method as defined in claim 25 wherein said optical supervisory channel has a fixed bandwidth, said fixed bandwidth including said message based optical channel bandwidth portion, which bandwidth portion is scaleable depending on a number of said optical channels each having a prescribed wavelength.

27. The method as defined in claim 25 further including the steps of obtaining information whether an optical channel is defective, and generating a forward defect indicator (FDI) message, said FDI message indicating the affected optical channel.

28. The method as defined in claim 27 wherein said step of generating generates said FDI message such that it indicates the cause of said defect in said optical channel.

* * * * *